United States Patent
Knopf et al.

(10) Patent No.: US 12,516,252 B2
(45) Date of Patent: Jan. 6, 2026

(54) COMPOSITIONS AND METHODS FOR REMOVING SULFUR COMPOUNDS FROM PROCESS STREAMS

(71) Applicant: VINK CHEMICALS GMBH & CO. KG, Kakenstorf (DE)

(72) Inventors: Jennifer Knopf, Kakenstorf (DE); Lyazzat Baussanova, Kakenstorf (DE); Ingo Krull, Kakenstorf (DE)

(73) Assignee: VINK CHEMICALS GMBH & CO. KG, Kakenstorf (DE)

( * ) Notice: Subject to any disclaimer, the term of this patent is extended or adjusted under 35 U.S.C. 154(b) by 249 days.

(21) Appl. No.: 18/018,740

(22) PCT Filed: Jul. 30, 2021

(86) PCT No.: PCT/EP2021/071489
§ 371 (c)(1),
(2) Date: Jan. 30, 2023

(87) PCT Pub. No.: WO2022/023565
PCT Pub. Date: Feb. 3, 2022

(65) Prior Publication Data
US 2023/0340338 A1    Oct. 26, 2023

(30) Foreign Application Priority Data
Jul. 31, 2020 (DE) .................... 10 2020 120 287.3

(51) Int. Cl.
*C10G 21/12* (2006.01)
*B01D 11/04* (2006.01)
*C10G 29/20* (2006.01)

(52) U.S. Cl.
CPC .......... *C10G 21/12* (2013.01); *B01D 11/0492* (2013.01); *C10G 29/20* (2013.01); *C10G 2300/207* (2013.01)

(58) Field of Classification Search
None
See application file for complete search history.

(56) References Cited

U.S. PATENT DOCUMENTS

| | | | |
|---|---|---|---|
| 2016/0175769 A1* | 6/2016 | Kamoun | B01D 53/52 252/189 |
| 2018/0371334 A1 | 12/2018 | Beilfuss et al. | |
| 2019/0194551 A1* | 6/2019 | de Oliveira Filho | C10L 3/103 |

FOREIGN PATENT DOCUMENTS

| WO | 02/051968 | 7/2002 |
|---|---|---|

OTHER PUBLICATIONS

International Search Report for PCT/EP2021/071489, mailed Nov. 4, 2021, 4 pages.
Written Opinion of the ISA for PCT/EP2021/071489, mailed Nov. 4, 2021, 6 pages.

\* cited by examiner

*Primary Examiner* — Tam M Nguyen
(74) *Attorney, Agent, or Firm* — NIXON & VANDERHYE

(57) ABSTRACT

Described are compositions including a reaction product of an amino alcohol and an aldehyde and a reaction product of a monohydric or polyhydric alcohol, an aldehyde and a nitrogen-containing compound. In addition, processes for removing sulfur compounds from process streams using such compositions are described, as well as such processes in which the process stream is contacted independently with a reaction product of an amino alcohol and an aldehyde and a reaction product of a monohydric or polyhydric alcohol, an aldehyde and a nitrogen-containing compound. Further described is the use of such compositions to remove sulfur compounds from process streams and the use of a reaction product of an amino alcohol and an aldehyde and a reaction product of a monohydric or polyhydric alcohol, an aldehyde and a nitrogen-containing compound to remove sulfur compounds from process streams.

6 Claims, No Drawings

COMPOSITIONS AND METHODS FOR REMOVING SULFUR COMPOUNDS FROM PROCESS STREAMS

CROSS-REFERENCE TO RELATED APPLICATIONS

This application is the U.S. national phase of International Application No. PCT/EP2021/071489 filed Jul. 30, 2021, which designated the U.S. and claims priority to DE Patent Application No. 10 2020 120 287.3 filed Jul. 31, 2020, the entire contents of each of which are hereby incorporated by reference.

FIELD OF INVENTION

The present invention relates to compositions comprising a reaction product of an amino alcohol and an aldehyde and a reaction product of a monohydric or polyhydric alcohol, an aldehyde and a nitrogen-containing compound. The present invention additionally relates to methods for removing sulfur compounds from process streams using such compositions, and to such methods wherein the process stream is contacted independently with a reaction product of an amino alcohol and an aldehyde and a reaction product of a monohydric or polyhydric alcohol, an aldehyde and a nitrogen-containing compound. Further, the present invention relates to the use of such compositions to remove sulfur compounds from process streams and to the use of a reaction product of an amino alcohol and an aldehyde and a reaction product of a monohydric or polyhydric alcohol, an aldehyde and a nitrogen-containing compound to remove sulfur compounds from process streams.

BACKGROUND

The presence of sulfur compounds in general, and hydrogen sulfide in particular, in process streams, especially in hydrocarbon-containing process streams in the oil and gas industry, poses challenges to the handling and processing of such process streams in many areas, as such sulfur compounds can pose a non-negligible health and safety risk and are also detrimental from an environmental perspective. There are many different types of sulfur compounds, but the most commonly found sulfur compounds in process streams are sulfhydryl compounds, such as hydrogen sulfide ($H_2S$), organic sulfur compounds with S—H groups (which are also called mercaptans), thiocarboxylic acids (such as thionic acid (RC(S)OH) and thiolic acid (RC(O)SH)), and dithionic acids (RC(S)SH) and compounds derived from these compounds. $H_2S$ is an unpleasant-smelling, toxic gas that poses a high risk to health and causes severe corrosion in technical equipment. Legislators have therefore imposed strict requirements to reduce the $H_2S$ content in process streams, amongst other things.

WO02/051968 A1 discloses a process for reducing the amount of $H_2S$ in a liquid or gas by treatment with an $H_2S$ scavenging agent (hereinafter also referred to as "scavenger"). The $H_2S$-scavenging agent is obtained by reacting i) a compound having carbonyl group with ii) an alcohol, thiol, amide, thioamide, urea or thiourea. Preferably, the product is prepared by reacting formaldehyde with amine-free alcohol or urea. An exemplary amine-free alcohol is ethylene glycol. The $H_2S$ scavenging agent may optionally be used together with amine, in particular monoethanolamine.

WO98/02501 discloses that bisoxazolidines can be used as scavenging agents for sulfhydryl compounds. An exemplary bisoxazolidine is 3,3'-methylenebis(5-methyloxazolidine) (hereinafter also referred to as MBO), which is obtained by reacting isopropanolamine with formaldehyde (in the molar ratio 2:3). However, the sulfur compound scavenging activity of 3,3'-methylenebis(5-methyloxazolidine), especially in process streams with a low water content, needs improvement.

Such process streams are often formulated based on hydrocarbons. The use of MBO then requires longer contact times with the process stream for effective trapping of sulfhydryl compounds due to slow reaction kinetics, as well as the use of higher doses of the scavenging agent (typically at least a five-fold weight excess relative to the amount of sulfur compound to be removed from the process stream). This is in need of improvement from an environmental and economic perspective.

Furthermore, the alkaline pH of compounds of an amino alcohol and an aldehyde, such as MBO, can lead to incompatibilities with salt water contained in process streams, both at low and high salt loads. The relatively high pH favors the formation of precipitates in the process stream, which can adhere to surfaces in the equipment through which the process stream passes, leading to equipment blockages, particularly at valves and other narrow passages. Precipitates can be, first, inorganic salts, such as carbonates and sulfates, which, set on surfaces, are also known as scales. Other types of precipitates are polymeric in nature and can be, for example, reaction products from a sulfur compound such as $H_2S$ and the scavenging agent used. Such precipitates are usually voluminous, but can also have a sticky, highly viscous consistency. The formation of precipitates of any kind in process streams should be avoided from an economic point of view whenever possible, as this leads, among other things, to increased and costly and time-consuming cleaning of the plant.

WO2016/100224 A2 discloses compositions for the removal of sulfur compounds from moist or dry gaseous streams. The compositions contain, in addition to at least one compound for scavenging the sulfur compound, at least one hygroscopic agent. Preferred compounds for scavenging the sulfur compounds include triazines of monoethanolamine, methylamine or methoxypropylamine. An exemplary hygroscopic agent is glycerol. However, triazines have a relatively high relative nitrogen content. This can affect their scope of use, particularly in refineries, since nitrogen-containing compounds can react with hydrochloric acid impurities in the process stream to form highly corrosive chloramines at the high temperatures reached in refinery processes.

WO 2017/102693 A1 also discloses processes for the removal of sulfur compounds primarily from process streams containing very little or no water. The compositions described therein contain, in addition to MBO, at least one other additive selected from urea, urea derivatives, amino acids, guanidine, guanidine derivatives and 1,2-diols. However, improved scavenging agents for sulfur compounds are also desirable for process streams with higher water contents.

Consequently, there is a pronounced need for improved compositions for the removal of sulfur compounds from process streams, especially those which do not have the above-mentioned disadvantages and instead, in addition to their ability to effectively and promptly bind sulfur compounds, especially $H_2S$, above all have good compatibility with (salt) water potentially contained in the process stream and do not lead to the formation of precipitates ("scale") in the process stream. In addition, it would be desirable if such compositions for the removal of sulfur compounds from process streams also have sufficient storage stability, for example over three months or more.

Furthermore, there is a need for corresponding improved processes for the removal of sulfur compounds from process streams.

DESCRIPTION

This task is solved by a composition comprising
a) a reaction product of an amino alcohol and an aldehyde; and
b) a reaction product of a monohydric or polyhydric alcohol, an aldehyde and a nitrogen-containing compound.

It was surprisingly found that such a composition can, on the one hand, effectively remove sulfur compounds, in particular $H_2S$, from a process stream and, on the other hand, at the same time exhibit very good compatibility with salt water potentially contained in the process stream. In this regard, only a slight excess by weight of composition according to the invention over sulfur compound to be removed from the process stream is sufficient. In particular, the use of the compositions of the invention in sulfur-containing process streams does not exhibit formation of precipitates and/or undesirable polymeric by-products in the process stream that could adhere to surfaces in the equipment through which the process stream passes. Furthermore, the composition according to the invention shows a strong reduction in the content of sulfur compounds, especially $H_2S$, already after a short time, even in saline and/or multiphase (for example, oil/water) process streams and at elevated process stream temperatures. This synergism of components a) and b) what not predictable, especially because component b) alone has a strong tendency to form precipitates in the presence of sulfur compounds. Furthermore, the composition according to the invention does not require triazines and therefore has a desirably lower relative nitrogen content, which allows the composition according to the invention to also be used in refinery applications.

Further, the problem is solved by a process for removing sulfur compounds from process streams using such compositions, and such process wherein the process stream is contacted independently with a reaction product of an amino alcohol and an aldehyde and a reaction product of a monohydric or polyhydric alcohol, an aldehyde and a nitrogen-containing compound.

In a first aspect, the present invention relates to a composition comprising a reaction product of an amino alcohol and an aldehyde; and a reaction product of a monohydric or polyhydric alcohol, an aldehyde, and a nitrogen-containing compound.

The composition according to the invention comprises, as an essential component (component a), a reaction product of an amino alcohol and a first aldehyde. The reaction product is thereby a condensation product of the mentioned components.

The amino alcohol is not further limited. However, preferred amino alcohols are those with a short carbon chain and a molecular weight in the range of 50 to 200 g/mol, for example 2-aminoethanol (also referred to as monoethanolamine), 2-hydroxypropylamine (also referred to as isopropanolamine), 3-aminopropanol (also referred to as propanolamine), 1-amino-1-propanol, 2-amino-2-methylpropanol (also referred to as aminomethylpropanol), 4-aminobutanol (also referred to as butanolamine), 3-amino-1-butanol, 2-amino-1-butanol, 1-amino-1-butanol, 1-amino-2-butanol, 1-amino-2-pentanol, 1-amino-2-hexanol, 1-amino-2-heptanol and 1-amino-2-octanol. Of these aminoalcohols, those having a primary amino group are further preferred, in particular 2-aminoethanol, 2-hydroxypropylamine, 3-aminopropanol and 4-aminobutanol. The amino alcohol is particularly preferred to be 2-hydroxypropylamine.

The first aldehyde is also not further limited, and any compound containing an aldehyde group can in principle be used. However, preferred are and aldehydes having 1 to 6 carbon atoms, for example formaldehyde, acetaldehyde (ethanal), propanal, butanal, pentanal and hexanal. The first aldehyde is particularly preferably formaldehyde. The formaldehyde can be used to prepare component a), for example, as a formalin solution or as paraformaldehyde, preferably as paraformaldehyde.

In one embodiment, the amino alcohol and the first aldehyde are used to prepare component a) in a molar ratio of 2:1 to 1:5, preferably in a molar ratio of 1:1 to 1:3. For example, the amino alcohol and the first aldehyde can preferably be used in a molar ratio of 1:1, 2:3 or 1:3. Particularly preferably, the amino alcohol and the first aldehyde are used in a molar ratio of 2:3.

In a preferred embodiment, component a) is a reaction product of 2-hydroxypropylamine and formaldehyde, wherein the 2-hydroxypropylamine and the formaldehyde are preferably used in a molar ratio of 2:1 to 1:5, preferably in a molar ratio of 1:1 to 1:3. For example, the 2-hydroxypropylamine and the formaldehyde can be used in a molar ratio of 1:1, 2:3 or 1:3. Particularly preferably, the 2-hydroxypropylamine and the formaldehyde are used in a molar ratio of 2:3. If the 2-hydroxypropylamine and the formaldehyde are used in a ratio of 1:1, component a) is α,α',α"-trimethyl1,3,5-triazine-1,3,5-(2H,4H,6H)triethanol (available, for example, under the trade name grotan WS from Vink Chemicals GmbH & Co. KG, Kakenstorf, Germany). If the 2-hydroxypropylamine and formaldehyde are used in a 2:3 ratio, component a) is 3,3'-methylenebis(5-methyloxazolidine) (MBO). The reaction of 2-hydroxypropylamine and formaldehyde in the ratio 1:3 is described, for example, in EP3275910 A1.

In a particularly preferred embodiment, component a) of the composition according to the invention is 3,3'-methylenebis(5-methyloxazolidine).

The composition according to the invention comprises as a further essential component (component b)) a reaction product of a monohydric or polyhydric alcohol, a second aldehyde and a nitrogen-containing compound. The reaction product is thereby a condensation product of said components. Component b) may thereby preferably be a reaction product from a mixture which, in addition to the monohydric or polyhydric alcohol, the second aldehyde and the nitrogen-containing compound, additionally comprises an alkalizing agent, such as carbonates, for example potassium carbonate, or (earth) alkali hydroxides, for example sodium hydroxide or potassium hydroxide, preferably potassium carbonate. The term "reaction product" as used herein means that the various components of the mixture have reacted with each other to form covalent bonds. In other words, the term "reaction product" does not include mere mixtures of the ingredients that have not reacted with each other.

The monohydric or polyhydric alcohol is not further limited and may be any compound comprising one or more hydroxyl groups. The term "monohydric alcohol" as used herein means a compound containing one hydroxyl group, and the term "polyhydric alcohol" as used herein means a compound containing more than one hydroxyl group, i.e., multiple hydroxyl groups. The alcohol may comprise aliphatic, cycloaliphatic, and/or aromatic groups, with aliphatic and/or cycloaliphatic groups being preferred. The aliphatic and/or cycloaliphatic groups may be saturated or unsaturated and are preferably saturated. Further preferably, the monohydric or polyhydric alcohol is aliphatic and particularly preferably an aliphatic saturated alcohol. In another preferred embodiment, the monohydric or polyhydric alcohol does not contain a nitrogen atom, i.e., the monohydric or polyhydric alcohol is preferably a nitrogen-free compound.

In a preferred embodiment, the monohydric or polyhydric alcohol contains 1 to 6 hydroxyl groups and is, for example, glycerol, ethylene glycol, propylene glycol, methanol, ethanol, propanol, isopropanol, n-butanol, or a low molecular weight liquid polyvinyl alcohol. Preferably, the monohydric or polyhydric alcohol is a dihydric alcohol (i.e., an alcohol having two hydroxyl groups), for example, a glycol, and particularly preferably ethylene glycol.

The second aldehyde is also not further limited, and any compound containing an aldehyde group can in principle be used. However, preferred aldehydes are those having 1 to 6 carbon atoms, for example formaldehyde, acetaldehyde (ethanal), propanal, butanal, pentanal and hexanal. The second aldehyde is particularly preferably formaldehyde, which can be used to prepare component b), for example as a formalin solution or as paraformaldehyde, preferably as paraformaldehyde.

The nitrogen-containing compound is also not further limited, and any compound containing nitrogen can in principle be used. However, it is preferred that the nitrogen-containing compound is different from the monohydric or polyhydric alcohol. However, it is further preferred that the nitrogen-containing compound is a compound selected from urea, urea derivatives, compounds containing at least one urea group, amino acids, guanidine, guanidine derivatives and compounds containing at least one guanidine group. Still further preferably, the nitrogen-containing compound is urea, a urea derivative, or a compound containing at least one urea group, and particularly preferably, the nitrogen-containing compound is urea.

In one embodiment, component b) is a reaction product of a monohydric or polyhydric alcohol, a second aldehyde and a compound selected from urea, urea derivatives and compounds containing at least one urea group, and preferably a reaction product of a monohydric or polyhydric alcohol, formaldehyde and a compound selected from urea, urea derivatives and compounds containing at least one urea group.

In another embodiment, component b) is a reaction product of a monohydric or polyhydric alcohol, formaldehyde and a nitrogen-containing compound, preferably a reaction product of a dihydric alcohol, formaldehyde and a nitrogen-containing compound, more preferably a reaction product of a dihydric alcohol, formaldehyde and a compound selected from urea, urea derivatives and compounds containing at least one urea group, and even more preferably a reaction product of a dihydric alcohol, formaldehyde and urea. Particularly preferred is component b) a reaction product of monoethylene glycol, formaldehyde and urea.

The monohydric or polyhydric alcohol may be present in the mixture for preparing the reaction product of component b) in an amount of 20-50% by weight, preferably 24-44% by weight, more preferably 29-39% by weight and particularly preferably 32-36% by weight, in each case based on the total weight of component b). The second aldehyde may be present in the mixture for preparing the reaction product of component b) in an amount of 30-65% by weight, preferably 33-60% by weight, more preferably 40-55% by weight and particularly preferably 45-50% by weight, in each case based on the total face of component b). The nitrogen-containing compound, preferably a compound selected from urea, urea derivatives and compounds containing at least one urea group, may be present in the mixture for preparing the reaction product of component b) in an amount of 5-35% by weight, preferably 8-25% by weight, more preferably 10-20% by weight, still more preferably 11-18% by weight and particularly preferably 12-16.5% by weight, in each case based on the total face of component b).

In one embodiment, component b) is a reaction product of a mixture comprising 20-50 wt % of the monohydric or polyhydric alcohol, 30-65 wt % of the second aldehyde, and 5-35 wt %, such as 8-25 wt %, 10-20 wt %, or 11-18 wt %, or preferably 12-16.5 wt %, of the nitrogen-containing compound, preferably a compound selected from urea, urea derivatives, and compounds containing at least one urea group. Preferably, component b) is a reaction product of a mixture comprising 24-44 wt % of the monohydric or polyhydric alcohol, 33-60 wt % of the second aldehyde, and 8-25 wt % of the nitrogen-containing compound. More preferably, component b) is a reaction product of a mixture comprising 29-39% by weight of the monohydric or polyhydric alcohol, 40-55% by weight of the second aldehyde, and 10-20% by weight of the nitrogen-containing compound, preferably a compound selected from urea, urea derivatives, and compounds containing at least one urea group. Even more preferably, component b) is a reaction product of a mixture comprising 32-36% by weight of the monohydric or polyhydric alcohol, 45-50% by weight of the second aldehyde and 12-16.5% by weight of the nitrogen-containing compound, preferably a compound selected from urea, urea derivatives and compounds containing at least one urea group.

In a preferred embodiment, component b) is a reaction product of a mixture comprising 20-50 wt %, preferably 24-44 wt %, of a dihydric alcohol, 30-65 wt %, preferably 33-60 wt %, formaldehyde, and 5-35 wt %, preferably 8-25 wt %, and more preferably 11-25 wt %, of a compound selected from urea, urea derivatives, and compounds containing at least one urea group.

In a further preferred embodiment, component b) is a reaction product of a mixture comprising 32-36 wt % of a dihydric alcohol, preferably a glycol, such as monoethylene glycol, 45-50 wt % formaldehyde and 12-17 wt %, urea.

In a still further preferred embodiment, component b) is a reaction product of a mixture comprising 20-50 wt %, preferably 24-44 wt %, of a dihydric alcohol, 30-65 wt %, preferably 33-60 wt %, formaldehyde, and 5-35 wt %, preferably 8-25 wt %, urea.

The total amount of the constituents monohydric or polyhydric alcohol, second aldehyde and nitrogen-containing compound may be 55% by weight or more, for example 70% by weight or more or 80% by weight& or more, preferably 90% by weight or more, and particularly preferably 95% by weight or more, for example 100% by weight, in each case based on the total weight of component b). Preferably, the total amount of the respective components of component b), for example monohydric or polyhydric alcohol, second aldehyde and nitrogen-containing compound, as well as the optionally and preferably additionally contained alkalizing agent, for example potassium carbonate, is 100% by weight, based on the total weight of component b).

In terms of molar ratios, component b) can be obtained, for example, as the reaction product of a mixture comprising 3-7 moles, preferably 4-6 moles, of the monohydric or polyhydric alcohol, 12-17 moles, preferably 14-16 moles, of the second aldehyde and 1-4 moles, preferably 2-3 moles, of the nitrogen-containing compound, preferably a compound selected from urea, urea derivatives and compounds containing at least one urea group.

For example, component b) can preferably be obtained as the reaction product of a mixture comprising 3-7 moles, preferably 4-6 moles, of a dihydric alcohol, preferably a glycol such as monoethylene glycol, 12-17 moles, preferably 14-16 moles, of formaldehyde and 1-4 moles, preferably 2-3 moles, of a compound selected from urea, urea derivatives and compounds containing at least one urea group, preferably urea.

Combining the components of the mixture to prepare component b) can be done in various ways. Five variants are described below by way of example in the case where the monohydric or polyhydric alcohol is a glycol, preferably monoethylene glycol, the second aldehyde is formaldehyde and the nitrogen-containing compound is urea. Of course, however, the respective components can be interchanged according to their definition. In a variant A, a mixture comprising a urea-formaldehyde adduct (for example, dimethylolurea) and the reaction product of glycol and formaldehyde is prepared. In a variant B, a mixture comprising a urea-formaldehyde adduct (for example, dimethylolurea) and an alkylene glycol formal is prepared. In a variant C, a mixture comprising urea, formaldehyde and the reaction product of glycol with formaldehyde is prepared. In a particularly preferred variant D, a mixture comprising formaldehyde, urea, ethylene glycol and optionally a small amount of alkalizing agent, for example potassium carbonate, is prepared. In a variant E, a mixture is prepared comprising the reaction product of formaldehyde with glycol with the addition of urea.

After the mixture has been prepared, it is processed to give the reaction product. The reaction (or condensation) takes place at a temperature of at least about 40° C., preferably at least about 50° C., more preferably 70° C. to 105° C., particularly 90° C. to 100° C., with a reaction temperature of 95 to 100° C. being particularly preferred. At the end of the reaction, water may be removed to reduce the water content of the reaction product. However, preferably no water is withdrawn after the end of the reaction. In a preferred embodiment, the condensation of the mixture takes place at 95° C. over a period of 3 hours.

The composition according to the invention comprises components a) and b) preferably in a weight ratio of from 10:1 to 1:20, preferably from 5:1 to 1:10, more preferably from 1:1 to 1:7, and particularly preferably in a weight ratio of from 1:2 to 1:7.

In a preferred embodiment, in the composition according to the invention, component a) is a reaction product of 2-hydroxypropylamine and formaldehyde in a molar ratio of 2:1 to 1:5, and component b) is a reaction product of a mixture comprising 20-50% by weight of monoethylene glycol, 30-65% by weight of formaldehyde and 5-35% by weight of urea. Particularly preferred is the weight ratio of component a) to component b) of 1:2 to 1:7.

The composition according to the invention may be in the form of a concentrate and comprise from 5 to 70% by weight of component a) and from 30 to 95% by weight of component b), preferably from more than 10 to 60% by weight of component a) and from 40 to 90% by weight of component b), more preferably from more than 10 to 50% by weight of component a) and from 50 to 90% by weight of component b), and even more preferably from 20 to 40% by weight of component a) and from 60 to 80% by weight of component b).

In addition to components a) and b), the composition according to the invention may comprise further components, such as at least one solvent and/or at least one other customary additive. Solvents may be selected from the group comprising water, alcohols, such as methanol and ethanol, glycols, such as propylene glycol and monoethylene glycol, hydrocarbons, such as benzene, $C_{10-13}$ alkyl derivatives, and mixtures thereof, preferably from the group comprising water, alcohol and mixtures thereof. Common additives are especially all compounds known as "oilfield chemicals" and may be selected from the group comprising corrosion inhibitors, scale inhibitors, oxygen scavengers, dispersants, for example for kerosene and/or asphalt, emulsifiers, demulsifiers, surfactants and mixtures thereof.

The composition according to the invention, if it is present as a concentrate, can thereby also essentially consist of components a) and b). In this case, the total amount of component a) and component b) is 100% by weight, based on the total composition. However, the composition according to the invention, when present as a concentrate, may also comprise small amounts of solvent, for example 5% by weight or less, or even 3% by weight or less. Preferably, the composition according to the invention, when present as a concentrate, comprises 1% by weight or less of solvent, for example 0.8% by weight or less or 0.5% by weight or less. In one embodiment, the composition according to the invention comprises 0.1-5% by weight of solvent, preferably water. In another preferred embodiment, the composition according to the invention comprises 1% by weight or less, for example 0.8% by weight or less, 0.5% by weight or less, or 0.3% by weight or less water. Surprisingly, it has been shown that reducing the water content in the composition according to the invention, for example to 1% by weight or less, to 0.5% by weight or less, or to 0.3% by weight or less, improves its storage stability.

Alternatively to the concentrate, the composition according to the invention may be in the form of a semi-concentrate and comprise 1 to 10% by weight of component a) and 10 to 50% by weight of component b), preferably 3 to 8% by weight of component a) and 30 to 45% by weight of component b).

If the composition according to the invention is present as a semi-concentrate, the composition according to the invention further comprises at least one solvent and optionally at least one other customary additive. The solvents and optional other customary additives may be the same as described above for the concentrate.

The composition according to the invention, if it is in the form of a semi-concentrate, may consist essentially of components a) and b) in the above-mentioned ranges of amounts, plus the at least one solvent and the optionally at least one other customary additive. In this case, the total amount of component a) and component b) as well as the at least one solvent and the optionally at least one other customary additive is 100% by weight, based on the total composition.

In another, second aspect, the present invention relates to a process for removing one or more sulfur compounds from process streams in which the process stream containing the sulfur compound or compounds is contacted with a composition as described above.

In one embodiment, in the process of the invention, the composition may be contacted with the process stream in a weight ratio to the amount of sulfur compound in the process stream of from 1:2 to 15:1, preferably from 1:1 to 10:1, and more preferably from 2:1 to 6:1.

For example, in the process according to the invention, the composition according to the invention may be present in an amount in the range of 0.0005-5 wt %, preferably in an amount of 0.001-1 wt %, and particularly preferably in an amount of 0.005-0.5 wt %, each based on the total weight of the process stream.

Typical amounts of sulfur compounds in process streams are in the range of 0.0001-1 wt %, for example in the range of 0.001-0.1 wt % or from 0.005-0.05 wt %, each based on the total weight of the process stream.

In a further embodiment process, in the process according to the invention, the process stream is a liquid or gaseous process stream and preferably a liquid or gaseous hydrocarbon stream.

The liquid or gaseous hydrocarbon stream, in particular the liquid hydrocarbon stream may also comprise an aqueous phase. In this regard, the ratio of the organic phase to the aqueous phase may be from 1:20 to 20:1, preferably from 10:1 to 1:10, more preferably from 5:1 to 1:5, and most preferably from 2:1 to 1:2. In other embodiments, the hydrocarbon stream may comprise no more than 40% by weight, such as no more than 30% by weight or no more than 20% by weight or no more than 10% by weight water. However, the hydrocarbon stream may also be substantially free of water. "Substantially free" in this context means that the hydrocarbon stream contains no more than 1% by weight of water. Preferably, however, the hydrocarbon stream contains at least some water, such as from 0.2 wt % or more or 0.5 wt % or more, such as from 0.2 wt % to less than 1 wt % or from 0.5 wt % to less than 1 wt %. Surprisingly, it was found that the presence of at least some water in the process stream further improves the efficiency of the composition of the invention to remove sulfur compounds from the process stream.

The one or more sulfur compounds that can be removed from the process streams using the process of the invention include $H_2S$, sulfides, mercaptans, and thiols. Preferably, the process according to the invention removes $H_2S$ and/or mercaptans from the process streams.

In another, third aspect, the present invention relates to a process for removing one or more sulfur compounds from process streams, wherein the process stream containing the sulfur compound or compounds is treated with
  a) a reaction product of an amino alcohol and an aldehyde; and
  b) a reaction product of a monohydric or polyhydric alcohol, an aldehyde and a nitrogen-containing compound
is brought into contact independently of each other.

In this regard, component a) and component b) and their relative weight ratio are as described above for the composition according to the invention according to the first aspect of the invention. It has been found that the beneficial effects of the invention can also be achieved when the essential components of the compositions according to the invention, namely component a) and component b) are added to the process stream sequentially and/or at different points. In other words, in the process according to this aspect of the invention, the composition according to the invention as such is not added to the process stream, but components a) and b) thereof are added independently, i.e. individually. Components a) and b) then mix only in the process stream and still achieve their synergistic effect. Preferably, both components a) and b) are essentially free of water.

Specific embodiments of the process according to the third aspect of the invention, in particular with respect to type of process stream and relative amount of sulfur compound in the process stream to active composition ("scavenger") are as described above for the process according to the second aspect of the invention. In this regard, the amount of active composition according to the second aspect of the composition in the third aspect of the composition is equal to the sum of the amounts of component a) and component b).

In a further, fourth aspect, the invention relates to the use of the above-described composition according to the first aspect of the invention for removing one or more sulfur compounds from process streams. In this regard, the process streams are as described above in connection with the second aspect of the invention.

In a further, fifth aspect, the invention relates to the use of:
  a) a reaction product of an amino alcohol and an aldehyde; and
  b) a reaction product of a monohydric or polyhydric alcohol, an aldehyde and a nitrogen-containing compound
for the removal of one or more sulfur compounds from process streams.

In this regard, component a) and component b) and their relative weight ratio are as described above for the composition according to the invention in accordance with the first aspect of the invention, and the process streams are as described above in connection with the second aspect of the invention. It was found that the advantageous effects of the use according to the invention according to the fourth aspect of the invention can also be achieved when the essential components of the composition according to the invention, namely components a) and b) are added independently to a process stream and not in the form of a composition to the process stream. Preferably, both components a) and b) are substantially free of water. Components a) and b) can, for example, be added to the process stream in temporal succession and/or at different points. Several individual additions of partial amounts of the total amounts of components a) and b) to the process stream, which are independent of each other in terms of time and/or position, can also be made.

EXAMPLES

Manufacturing Example 1: Preparation of Scavenger Compositions

For the preparation of compositions according to the invention, as component a) MBO (reaction product of hydroxypropylamine and formaldehyde) commercially available as Stabicor® S 100 from Vink Chemicals GmbH & Co. KG (Kakenstorf, Germany) was used, and as component b) a reaction product of monoethylene glycol (CAS number: 107-21-1), formaldehyde (CAS number: 30525-89-4) and urea (CAS number: 57-13-6) (hereinafter also referred to as EUF)) also commercially available from Vink Chemicals GmbH & Co. KG (Kakenstorf, Germany) as Stabicor® S 300 was used.

Scavenger compositions according to the invention were prepared by
  a) Mixing of 50% by weight EUF and 50% by weight MBO;
  b) mixing 75% by weight EUF and 25% by weight MBO; and
  c) Mixing of 25% by weight EUF and 75% by weight MBO.

Manufacturing Example 2: Manufacturing Process Streams

Benzene, $C_{10-13}$-alkyl derivatives (CAS number: 67774-74-7) was used as the organic phase (oil phase) and distilled water as the aqueous phase. The phases were used individually to simulate a process stream, i.e., a first process stream consisted only of an organic oil phase and a second process stream consisted only of an aqueous phase. In addition, a third process stream was prepared with a 1:1 (wt/wt) ratio of oil phase and aqueous phase. To prepare $H_2S$-containing process streams, $H_2S$ was prepared by reacting iron sulfide with hydrochloric acid, and the obtained $H_2S$ was allowed to bubble through the aqueous phase and organic oil phase, respectively. The content of $H_2S$ in the two phases was then determined in accordance with the IP570 standard (see below). The two phases were then independently adjusted to a content of 0.02 wt % $H_2S$ by adding an appropriate amount of corresponding further solvent (i.e., oil or water). For the preparation of the 1:1 mixture, the aqueous phase and organic oil phase prepared in this way, each with 0.02 wt % $H_2S$ content, were used.

The content of $H_2S$ (or sulfide concentration), for example, in the simulated process streams or individual phases thereof, was determined in accordance with the IP 570 standard, Determination of hydrogen sulfide in mineral oils, using the following method:

- Exposure of the sample to the different scavengers (sulfur scavengers) at different temperatures and for different times
- Dilution of the sample with alkylbenzene to enter the linear working range of the analyzer system.
- Injecting the test sample (incl. scavenger) into the analyzer system
- Addition of acid (2M $H_3PO_4$ in water) and, if necessary, heating of the analysis sample in the analysis system
- Quantitative expulsion of the generated hydrogen sulfide in the analyzer system by means of air and transfer of the hydrogen sulfide to an electrochemical measuring electrode in the analyzer system
- The hydrogen sulfide generates a measuring signal at the electrochemical measuring electrode which is proportional to the respective amount of hydrogen sulfide
- Using evaluation software, the resulting peak area (composed of measurement signal intensity versus time) is determined and converted to a sulfide content based on a calibration line.

Example 1

To the process streams obtained according to Preparation Example 2, the scavenger compositions obtained according to Preparation Example 1 were added in a weight ratio of 1:1000 to the aqueous and organic oil phases, respectively. The final three process streams each contained 0.02 wt % $H_2S$ and 0.1 wt % scavenger compositions from Preparation Example 1.

The resulting scavenger-containing samples were stored in an oven at 40° C. for 24 hours. After 24 hours of storage, the samples were analyzed for precipitate formation. The results are summarized in Table 1.

TABLE 1

| Formation of polymeric $H_2S$ by-products. | Water/oil phase (1/1) | Oil phase | Water phase |
|---|---|---|---|
| Component a) | No | No | No |
| Component b) | Yes, formation of voluminous, white, polymeric precipitate. | Yes, formation of white, sticky precipitate | Yes, formation of voluminous, white, polymeric precipitate. |
| Component a) + b) (50:50) | No | No | No |
| Component a) + b) (75:25) | No | No | No |
| Component a) + b) (25:75) | No | No | No |

The results show that component a), i.e. the MBO alone, as well as the mixture of component a) and b) do not form any undesirable by-products after storage at 40° C. for 24 hours, even when components a) and b) are used in different weight ratios. In contrast, the use of component b) alone leads in all cases investigated to a significant formation of undesirable polymeric by-products, which are noticeable as precipitate.

The tests were repeated with samples in which the scavenger compositions obtained according to Preparation Example 1 were added to the process streams obtained according to Preparation Example 2 in a weight ratio of 1:2500 to the aqueous and organic oil phase, respectively. Thus, the final three process streams each contained 0.02 wt % $H_2S$ and only 0.04 wt % scavenger compositions from Preparation Example 1. These samples also showed the same behavior after storage at 40° C. for 24 hours as shown above in Table 1 for the samples containing 0.1 wt % scavenger compositions. The sample containing only EUF (i.e. component b)) showed voluminous, dense, white precipitate, whereas the other two samples (with MBO (i.e. component b)) alone and with a mixture of MBO and EUF 1:1) remained clear.

Example 2

The performance of different compositions to remove $H_2S$ from different systems (simulated process streams) after only a short contact time (2 h) was determined. The simulated process streams studied were (i) a multiphase mixture of oil and water (1:1) containing 0.02 wt % $H_2S$, as described above, and (ii) an aqueous salt solution mimicking seawater containing 0.37 g/l KCl, 0.57 g/l $CaCl_2$, 2.53 g/l $MgCl_2$, and 13.37 g/l NaCl and containing 0.02 wt % $H_2S$.

Example 2.1

The seawater mimicking aqueous salt solution (ii) was contacted with 0.04 wt % scavenger composition obtained according to Preparation Example 1a) (Example 2.1 c)). In addition, two comparison samples were prepared, each containing either 0.04 wt % MBO (Stabicor® S 100) (Example 2.1 a)), or 0.04 wt % EUF (Stabicor® S 300), (Example 2.1 b)). After mixing the components and storing the samples at 50° C. for two hours, the $H_2S$ content in the samples was determined as described above. The results are shown in Table 2.

TABLE 2

| | $H_2S$ reduction after two hours of storage at 50° C. in %, based on the initial $H_2S$ content of the respective sample. |
|---|---|
| Example 2.1 a)* | 74.8 |
| Example 2.1 b)* | 78.6 |
| Example 2.1 c) | 89.3 |

*= comparison

In the sample of Example 2.1 c), in which the salt solution was brought into contact with a composition of MBO and EUF according to the invention, a desirable, very high $H_2S$ reduction was already evident after 2 hours of contact time. The $H_2S$ reduction obtained for the example according to the invention was much higher than for the individual components (Example 2.1 a) and Example 2.1 b)). In particular, compared to the reference sample with MBO alone (Example 2.1 a)), the sample according to the invention showed a strongly increased $H_2S$ reduction.

Example 2.2

The multiphase mixture of oil and water (i) was contacted with 0.1 wt % scavenger composition obtained according to Preparation Example 1a) (Example 2.2 c)). In addition, two comparison samples were prepared, each containing either 0.1 wt % MBO (Stabicor® S 100) (Example 2.2 a)) or 0.1 wt % EUF (Stabicor® S 300) (Example 2.2 b)). After mixing the components and storing the samples at 50° C. for two hours, the $H_2S$ content in the water phases of the samples was determined as described above. In addition, the formation of polymeric by-products (visible by the formation of precipitates) was determined. The results are shown in Table 3.

TABLE 3

| | $H_2S$ reduction in % after two hours of storage at 50° C. in the water phase, based on the initial $H_2S$ content of the respective sample. | Formation of polymer by-products |
|---|---|---|
| Example 2.2 a)* | 58.3 | No |
| Example 2.2 b)* | 97.0 | Yes |
| Example 2.2 c) | 97.5 | No |

*= comparison

In the sample of Example 2.2 c), in which the multiphase mixture of oil and water was brought into contact with a composition of MBO and EUF according to the invention, a desirable, particularly high $H_2S$ reduction was already evident after two hours of contact time in the water phase. At the same time, there was no formation of undesirable, precipitate-forming polymeric by-products. The $H_2S$ reduction achieved for the example according to the invention was significantly higher than for the comparative sample with MBO alone (Example 2.2 a)). The comparative sample with EUF alone (Example 2.2 b)) showed an almost similar $H_2S$ reduction as the sample according to the invention, but here a voluminous white precipitate formed in the sample, indicating the formation of undesirable polymeric by-products.

Example 2.3

The multiphase mixture of oil and water (i) was contacted with 0.035 wt % scavenger composition obtained according to Preparation Example 1a) (Example 2.3 c)). In addition, two comparison samples were prepared, each containing either 0.035 wt % MBO (Stabicor® S 100) (Example 2.3 a)) or 0.035 wt % EUF (Stabicor® S 300) (Example 2.3 b)). After mixing the components and storing the samples at 50° C. for two hours, the $H_2S$ content in both phases of the samples was determined as described above. In addition, the formation of polymeric by-products (visible by the formation of precipitates) was determined. The results are shown in Table 4.

TABLE 4

| | $H_2S$ reduction in % after two hours of storage at 50° C. in the respective phases, based on the initial $H_2S$ content of the respective sample. | | Formation of polymer by-products |
|---|---|---|---|
| | aqueous phase | Oil phase | products |
| Example 2.3 a)* | 1.3 | 58.1 | No |
| Example 2.3 b)* | 51.4 | 46.7 | Yes |
| Example 2.3 c) | 49.8 | 50.6 | No |

*= comparison

In the sample of Example 2.3 c), in which the multiphase mixture of oil and water was brought into contact with a composition of MBO and EUF according to the invention, a desirably high $H_2S$ reduction was already evident in both the water phase and the oil phase after only two hours of contact time, despite the relatively low relative ratio of $H_2S$ to scavenger composition (1/1.75). Thereby, the $H_2S$ reduction is approximately equal in both phases and therefore desirably balanced. At the same time, there was no formation of undesirable precipitate-forming polymeric by-products. The comparative sample with MBO alone (Example 2.3 a) showed good $H_2S$ reduction in the oil phase but almost no $H_2S$ reduction in the aqueous phase and thus has unbalanced properties with respect to $H_2S$ reduction. The comparative sample with EUF alone (Example 2.3 b)) showed a similarly high $H_2S$ reduction as the sample according to the invention both in the aqueous phase and in the oil phase, but here a voluminous white precipitate was formed in the sample, indicating the formation of undesirable polymeric by-products.

Treatment of a process stream with a scavenger composition relative to $H_2S$ in the process stream of 1.75/1 is desirable from an economic standpoint due to the lower amount of scavenger composition required.

Example 2.4

The multiphase mixture of oil and the multi-water mimicking salt solution (ii) in the ratio 1:1 was contacted with 0.04 wt % scavenger composition obtained according to Preparation Example 1a) (Example 2.4 c)). In addition, two comparison samples were prepared, each containing either 0.04 wt % MBO (Stabicor® S 100) (Example 2.4 a)) or 0.04 wt % EUF (Stabicor® S 300) (Example 2.4 b)). After mixing the components and after already storing the samples for one hour at 50° C., the $H_2S$ content in both phases of the samples was determined as described above. In addition, the formation of polymeric by-products (visible by the formation of precipitates) was determined. The results are shown in Table 5.

TABLE 5

| | H$_2$S reduction in % after two hours of storage at 50° C. in the respective phases, based on the initial H$_2$S content of the respective sample. | | Formation of polymer by-products |
|---|---|---|---|
| | aqueous phase | Oil phase | |
| Example 2.4 a)* | 38.7 | 76.7 | No |
| Example 2.4 b)* | 54.3 | 45.0 | Yes |
| Example 2.4 c) | 70.1 | 80.7 | No |

*= comparison

In the sample of Example 2.4 c), in which the multiphase mixture of oil and water was brought into contact with a composition of MBO and EUF according to the invention, a desirable, very high H$_2$S reduction was already evident in both the water phase and the oil phase after only one hour of contact time, despite the relatively low relative ratio of H$_2$S to scavenger composition (1/2). The H$_2$S reduction is thereby similarly high in both phases and therefore desirably balanced. At the same time, there was no formation of undesirable, precipitate-forming polymeric by-products. The comparative sample with MBO alone (Example 2.4 a) showed very good H$_2$S reduction in the oil phase, but only limited H$_2$S reduction in the aqueous phase and thus has unbalanced properties with respect to H$_2$S reduction. The comparative sample with EUF alone (Example 2.4 b)) showed a balanced but only moderately high H$_2$S reduction compared to the sample according to the invention both in the aqueous phase and in the oil phase. In addition, a voluminous white precipitate formed in the sample here, indicating the formation of undesirable polymeric by-products.

Treating a process stream with a scavenger composition relative to H$_2$S in the process stream of 2/1 is desirable from an economic standpoint due to the lower amount of scavenger composition required.

Example 3

In another experiment, the compatibility of compositions according to the invention with different salt waters was tested. The salt waters tested were (i') a seawater mimicking aqueous salt solution containing 0.37 g/l KCl, 0.57 g/l CaCl$_2$, 2.53 g/l MgCl$_2$ and 13.37 g/l NaCl, and (ii') a natural gas aqueous phase mimicking aqueous salt solution containing 0.14 g/l KCl, 13.02 g/l CaCl$_2$, 2.55 g/l MgCl$_2$ and 56.9 g/l NaCl.

Different amounts of a scavenger composition of MBO and EUF (3:7) (Example 3.3), or of the individual components MBO (Example 3.2) or EUF (Example 3.1) were added to the salt waters (i') and (ii'). The samples were stored at different temperatures (70° C., 90° C., 110° C. and 130° C.) in the oven for 3 and 24 hours. Subsequently, the appearance of the brines was evaluated. The results are shown in Table 6.

TABLE 6

| 3 h | | Seawater | | | | Natural gas water | | | |
|---|---|---|---|---|---|---|---|---|---|
| | ppm | 70° C. | 90° C. | 110° C. | 130° C. | 70° C. | 90° C. | 110° C. | 130° C. |
| Example 3.1* | 0.01 | — | — | — | — | — | — | — | — |
| | 0.1 | — | — | — | — | — | — | — | — |
| | 1.0 | — | — | — | — | — | — | — | — |
| Example 3.2* | 0.01 | — | — | — | — | — | — | — | — |
| | 0.1 | — | — | — | — | — | — | — | — |
| | 1.0 | — | — | XXX | XXX | — | — | XXX | XXX |
| Example 3.3 | 0.01 | — | — | — | — | — | — | — | — |
| | 0.1 | — | — | — | — | — | — | — | — |
| | 1.0 | — | — | — | — | — | — | — | — |

| 24 h | | Seawater | | | | Natural gas water | | | |
|---|---|---|---|---|---|---|---|---|---|
| | Wt % | 70° C. | 90° C. | 110° C. | 130° C. | 70° C. | 90° C. | 110° C. | 130° C. |
| Example 3.1* | 0.01 | — | — | — | — | — | — | — | — |
| | 0.1 | — | — | — | — | — | — | — | — |
| | 1.0 | — | — | — | — | — | — | — | — |
| Example 3.2* | 0.0100 | — | — | — | — | — | — | — | — |
| | 0.1 | XXX | XXX | XXX | XXX | XXX | XXX | XXX | XXX |
| | 1.0 | XXX | XXX | XXX | XXX | XXX | XXX | XXX | XXX |
| Example 3.3 | 0.01 | — | — | — | — | — | — | — | — |
| | 0.1 | — | — | — | — | — | — | — | — |
| | 1.0 | — | — | XXX | XXX | — | XXX | XXX | XXX |

*Comparison
— no significant change in appearance; no precipitation
XXX Precipitation formation The results of this experiment show that MBO (component a) alone (Example 3.2) is only conditionally compatible with salt water. After only three hours of contact time at 110 and 130° C., undesirable precipitates form for the samples with 1 wt % MBO. After 24 hours of contact time, undesirable precipitates have already formed at 70° C. even in the samples with only 0.1 wt % MBO. By adding component b), this adverse property is largely suppressed (Example 3.3).

Example 4

In another experiment, the tendency of various compositions to form inorganic deposits ("scale") was tested. In the oilfield industry, common deposits are carbonate deposits.

First, two salt solutions were prepared. Salt solution (i") contained 12.15 g/l CaCl$_2$, 3.68 g/l MgCl$_2$ and 33 g/l NaCl. Salt solution (ii") contained 7.36 g/l NaHCO$_3$ and 33 g/l NaCl. The salt solutions were prepared by adding and dissolving the respective salts in demineralized water. Subsequently, each of the two salt solutions was saturated with $CO_2$. The salt solutions thus obtained were then mixed in a volume ratio of 1:1 and then 0.005 wt % of a commercial phosphonate-based scale inhibitor (mixture of phosphonates and phosphoric acid in aqueous hydrochloric acid) was added. 100 ml of the resulting salt solution was mixed with 0.02 ml of each of the different scavenger compositions (Example 4.1: reference without scavenger composition; Example 4.2: addition of MBO; Example 4.3: addition of EUF; and Example 4.4: addition of MBO and EUF (in a 3:7 ratio)). The samples were then stored at 80° C. for 4 hours. The conductivity of the samples was determined before and after storage with a measurement using a conductivity meter, portable, HCO 304 from VWR. Table 7 shows the results.

TABLE 7

| | Conductivity [ms] | | Difference |
|---|---|---|---|
| | Start (0 h) | After 4 h | [µs] |
| Example 4.1*: Reference example (salt solution only) | 64.2 | 64.0 | 200 |
| Example 4.2*: Addition of MBO | 64.3 | 63.6 | 700 |
| Example 4.3*: Addition of EUF | 64.3 | 64.2 | 100 |
| Example 4.4: Addition of MBO and EUF | 64.3 | 64.1 | 200 |

*= comparison

In all cases, the conductivity decreases. However, the conductivity drops much more for the sample in which only MBO was added than for the reference sample and for the samples in which only EUF (Example 4.3) or the mixture of MBO and EUF according to the invention (Example 4.4) was added. A decrease in conductivity generally indicates the formation of inorganic precipitate. The experiments thus indicate an adverse interaction between the scale inhibitor and the MBO, but this can be completely suppressed by the addition of EUF to the MBO.

Example 5

In another experiment, the storage stability of compositions according to the invention with different water contents was investigated. A 3:7 mixture of MBO and EUF was mixed with 5 wt % water (example 5a)) and with 0.5 wt % water (example 5b)), respectively. The obtained compositions were stored at 40° C. for 3 months and evaluated before (zero value) and after storage for their appearance, gas evolution, and cleavable formaldehyde content. The results are shown in Table 7.

TABLE 7

| | Example 5a) EUF/MBO (5% water by weight) | | Example 5b) EUF/MBO (0.5% by weight water) | |
|---|---|---|---|---|
| | Zero value | after 3 months at 40° C. | Zero value | after 3 months at 40° C. |
| Appearance | clear, colorless | clear, orange | clear, colorless | clear, slightly yellowish |
| Gassing of the containers (gas development) | no | yes, recognizable | no | a little bit |
| Active ingredient: releasable formaldehyde %. | 44.5 | 37.8 | 48.6 | 49.0 |

After three months of storage, the sample with 5% water by weight showed a recognizable orange discoloration as well as gassing of the storage containers, indicating a partial decomposition of the components. Likewise, there was a reduction of the cleavable formaldehyde by about 15% compared to the zero value, i.e. the sample before storage. The sample with 0.5 wt % water, on the other hand, showed only a slight yellowish discoloration after three months of storage and likewise only a very slight outgassing. In addition, no reduction of the cleavable formaldehyde was observed. This shows that a lower water content in the composition according to the invention increases its storage stability.

Example 6

In another experiment, the ability of scavenger compositions according to the invention to reduce the content of $H_2S$ in different mixtures (matrix compositions) of oil (alkylbenzene) and the seawater mimicking salt solution (ii) of Example 2 was investigated. The total amount of $H_2S$ in each of the mixtures studied was 200 ppm, the scavenger composition (3:7 (MBO/EUF)) was added in an amount of 600 ppm, and the exposure time after addition of the scavenger was two hours. The results are shown in Table 8.

TABLE 8

| Matrix composition | | | | |
|---|---|---|---|---|
| Oil (alkylbenzene) (in weight % of the matrix) | Sea water replicating salt solution (in weight % of the matrix) | Reduction in % in the oil phase | Reduction in % in the salt solution replicating seawater | Reduction in % calculated on the entire system |
| 100 | 0 | 43 | — | 43 |
| 99.5 | 0.5 | 96.7 | — | 96.7 |
| 70 | 30 | 92.4 | 73.1 | 86.6 |
| 50 | 50 | 94.6 | 82.4 | 88.4 |
| 30 | 70 | 89 | 80 | 82.5 |
| 10 | 90 | 97.5 | 85.3 | 86.6 |
| 0 | 100 | — | 97 | 97 |

There was significant $H_2S$ reduction in both the oil phase and the aqueous phase in all the mixtures of oil and (alkylbenzene) and the salt solution mimicking seawater (ii) investigated by addition of the scavenger composition. The $H_2S$ reduction is particularly pronounced for those mixtures containing at least some water.

The invention claimed is:

1. A composition, comprising
   a) 3,3'-methylenebis(5-methyloxazolidine); and
   b) a reaction product of a mixture comprising 20-50% by weight of monoethylene glycol, 30-65% by weight of formaldehyde and 5-35% by weight of urea.

2. The composition according to claim 1, wherein the weight ratio between component a) and component b) is from 5:1 to 1:10.

3. The composition according to claim 1, wherein the composition is a concentrate and comprises from more than 10 to 60% by weight of component a) and from 40 to 90% by weight of component b).

4. The composition according to claim 1, wherein the composition is a semi-concentrate and comprises 2 to 10% by weight of component a) and 10 to 50% by weight of component b).

5. The composition according to claim 1, wherein the weight ratio between component a) and component b) is from 1:1 to 1:7.

6. The composition according to claim 1, wherein the composition is a concentrate and comprises from 20 to 40% by weight of component a) and from 60 to 80% by weight of component b).

* * * * *